United States Patent

[11] 3,586,369

[72] Inventor George W. Worley
 Bolivar, Tenn.
[21] Appl. No. 797,297
[22] Filed Nov. 4, 1968
 Division of Ser. No. 646,289, June 15, 1967.
[45] Patented June 22, 1971
[73] Assignee Troxel Manufacturing Company
 Moscow, Tenn.

[54] METHOD OF MAKING A BICYCLE SEAT AND RESULTING PRODUCT
2 Claims, 19 Drawing Figs.

[52] U.S. Cl.................................................. 297/195
[51] Int. Cl.................................................. B62j 1/00
[50] Field of Search.................................... 297/195,
 213; 5/355, 361

[56] References Cited
UNITED STATES PATENTS
3,451,075 6/1969 Woodward.................. 5/355

FOREIGN PATENTS
937,573 1/1956 Germany..................... 297/195

Primary Examiner—James T. McCall
Attorney—John R. Walker, III

ABSTRACT: A method of making a bicycle seat including the steps of providing a rigid base; providing a top assembly having a toppiece of a lightweight flexible vinyl and having an edge portion around the periphery thereof, providing a continuous side formed of a vinyl substantially stiffer than said lightweight flexible vinyl, heat-sealing said continuous side to said lightweight flexible vinyl along said edge portion to establish a covering and securing said covering to said base by attaching said continuous side to said base.

A bicycle seat having a rigid base, a top assembly having a toppiece of a lightweight flexible vinyl, a continuous side of a vinyl that is substantially stiffer than said lightweight flexible vinyl, said side being bonded to said top assembly and being attached to said rigid base.

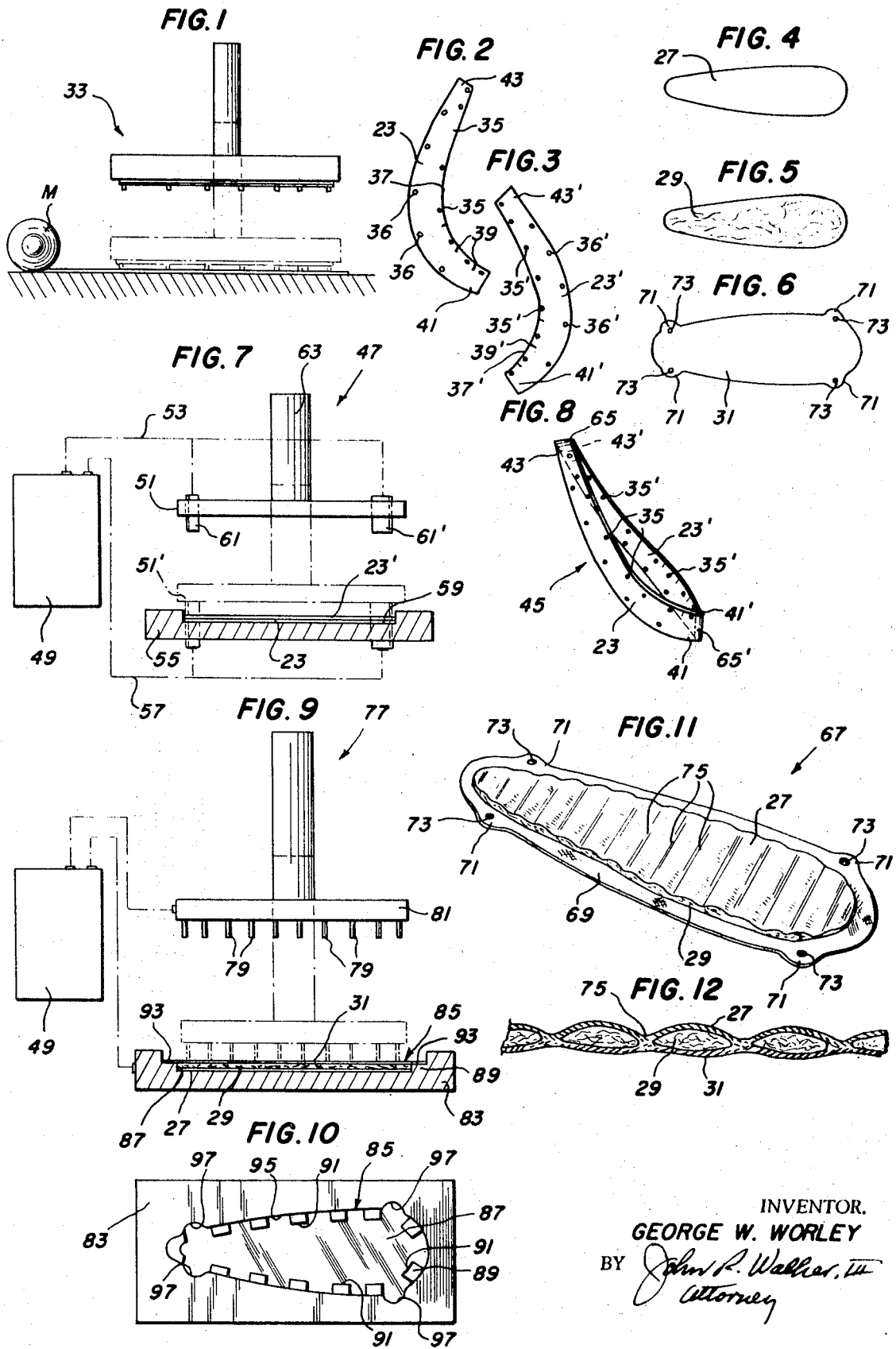

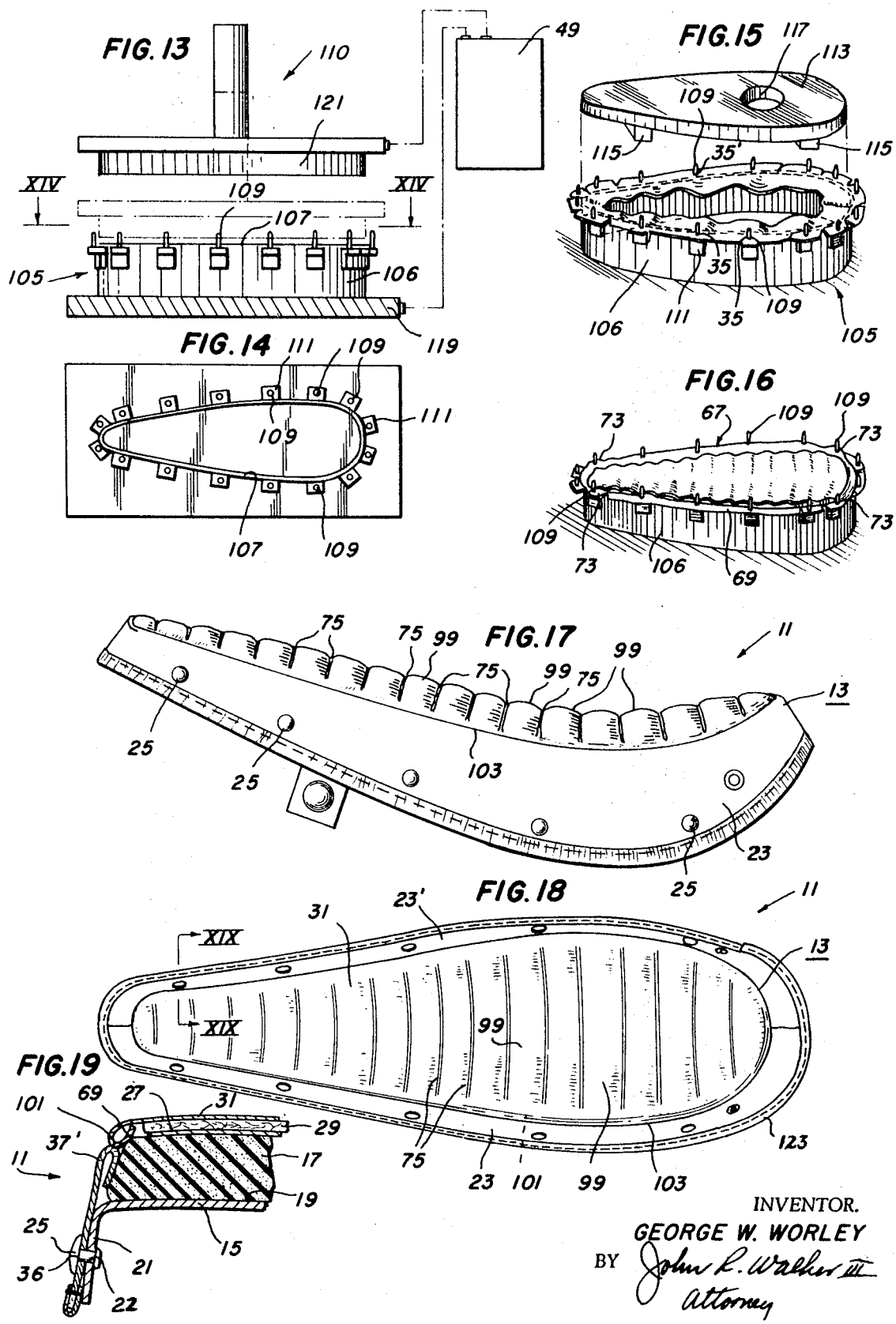

METHOD OF MAKING A BICYCLE SEAT AND RESULTING PRODUCT

This is a division of application Ser. No. 646,289, filed June 15, 1967.

BACKGROUND OF THE INVENTION

1. Field of the Invention

Method of making bicycle seats and product thereof.

2. Description of the Prior Art

First, for purposes of clarity and to define the terminology used herein, it should be pointed out that a bicycle seat normally includes an exterior portion that covers a rigid steel base. The exterior portion will be referred to herein as the covering and it includes the top portion and sides. There have been certain problems with prior bicycle seats in which the covering was formed of plastic. For example, in one type of bicycle seat the plastic covering has been of an integral piece of material, that is, the top and side portions have been made of one piece, with the integral piece being of a relatively thin plastic. With this type of structure there have been problems in attaching the flexible covering to the base. This has been a relatively expensive manufacturing process and one means has been to provide a piece of material that covers the underside of the base and to which the lower peripheral edges of the single piece of plastic is anchored as by stitching. With this type of saddle, when plastic was used that had ribs or a quilted type of appearance, since the plastic was a single piece of material, the quilted appearance was necessarily carried around the top and sides. In addition, with this relatively thin and flexible plastic less expensive types of attachments such as riveting could not be used to attach the piece of plastic to the rigid base. Also, emblems, designs, etc., could not be attached to the flexible plastic.

SUMMARY OF THE INVENTION

The present invention is directed towards overcoming the heretofore-mentioned and other problems in prior bicycle seats. Thus, one of the objects of the present invention is to provide a method for forming a bicycle seat in which the covering is formed by providing a vinyl toppiece, providing the sides of the covering of another piece of vinyl, and heat-sealing the sides to the top. Another concept of the present invention is to form the toppiece of a lightweight flexible vinyl and to form the sides of a relatively stiff vinyl, which can then be riveted to the rigid metal base. This provides a product which is improved in appearance, which is economical to manufacture, which has sides that gives support to the flexible top, which can be used more advantageously as for example, by attaching emblems, designs, etc., thereto, and which can be utilized to provide only a quilted portion on the top of the saddle with the sides remaining smooth. Another concept in the improved method of the present invention is to provide steps in the method thereof for aligning the various parts with one another so that a very neat appearing and accurately formed bicycle seat can be provided.

In general, the method of the present invention contemplates making a bicycle seat from a relatively lightweight flexible vinyl, a vinyl backup material, a stiff supported vinyl, quilting medium, and a metal base; comprising the steps of cutting said lightweight flexible vinyl, said backup material, said stiff supporting vinyl and said quilted medium to provide a pair of sidepieces formed of said stiff supported vinyl, a backup piece formed of said vinyl backup material, a quilting medium piece, and a toppiece larger in size than each of said backup piece and said quilted medium piece; heat-sealing the opposite ends of said sidepieces together to establish a continuous side; heat-sealing said backup piece, said quilting medium piece and said toppiece together to form a top assembly with said quilting medium piece between said toppiece and said backup piece and with said top piece extending beyond the edges of said quilted medium piece and said backup piece to provide an edge portion of said top piece around the periphery of said top assembly; heat-sealing said continuous side to said edge portion of said toppiece to establish a covering and riveting said covering to said base to provide said bicycle seat.

BRIEF DESCRIPTION OF THE DRAWING

FIG. 1 is a schematic view of the die-cutting step of the present invention.

FIG. 2 is a plan view of one of the pair of vinyl sidepieces after the diecutting step has been performed.

FIG. 3 is a plan view of the other of the pair of sidepieces after the diecutting step has been performed.

FIGS. 4, 5 and 6 are plan views of the components of the top assembly before assembly.

FIG. 7 is a schematic view of the apparatus used to heat seal the ends of the sidepieces to establish the continuous side, and showing this step in the method of the present invention.

FIG. 8 is a perspective view of the above-mentioned continuous side after being heat-sealed.

FIG. 9 is a schematic view of the apparatus used to heat-seal the top assembly and showing this step in the method of the present invention.

FIG. 10 is a plan view of the holder of the apparatus of FIG. 9.

FIG. 11 is an enlarged perspective view of the top assembly after the step shown in FIG. 9 has been completed.

FIG. 12 is a further enlarged fragmentary cross-sectional view of the top assembly of FIG. 11.

FIG. 13 is a schematic view of the apparatus used to heat-seal the top assembly and the continuous side showing this step in the method of the present invention.

FIG. 14 is a plan view of the holder portion of the apparatus of FIG. 13.

FIG. 15 is a perspective view of the holder portion showing the continuous side in place on the holder and showing the positioning block ready to be put into place.

FIG. 16 is a perspective view of the holder showing the top assembly in place thereon.

FIG. 17 is a side elevational view of the completed bicycle seat which has been made in accordance with the present method.

FIG. 18 is a top plan view of the bicycle seat of FIG. 17.

FIG. 19 is a fragmentary enlarged sectional view taken as on the line XIX—XIX of FIG. 18.

DESCRIPTION OF THE PREFERRED EMBODIMENT

The bicycle seat 11 of the present invention comprises in general a covering 13, a rigid metal base 15, and if desired, a suitable resilient pad 17, formed of sponge rubber, plastic or the like interposed between the top surface 19 of base 15 and covering 13. The metal base 15 is preferably formed by well-known methods and is of a shape corresponding to the particular shape of the bicycle seat to be made. For example, to make the elongated type of bicycle seat shown in FIGS. 17—19, the base 15 in plan is generally oblong, is somewhat pointed at one end and has a depending skirt 21 around the periphery thereof in the usual manner. In addition, base 15 is provided with apertures 22 in spaced-apart relationship around depending skirt 21 for the reception of rivets 25 to hold covering 13 in place, as will be more apparent in the description to follow later in the specification.

To form covering 13 the various components thereof shown in FIGS. 2—6 are first provided, namely, the pair of sidepieces 23—23', backup piece 27, quilting piece 29, and toppiece 31, respectively. The components shown in FIGS. 2—6 are preferably provided from sheets of material as by diecutting, by suitable means as the diecutting apparatus 33, of known construction shown schematically in FIG. 1.

The pair of sidepieces 23, 23' are formed from a relatively stiff supported vinyl, as for example, in the range of 0.040 to 0.060 inches. The outline shape of the sidepieces 23, 23' correspond to the desired shape of the right- and left-hand sides of the finished bicycle seat 11, and in diecutting a plurality of apertures 35, 35' are respectively provided along the edges 37, 37' of the respective side pieces 23, 23'. In addition, a plurality of apertures 36, 36' are respectively provided in sidepieces 23, 23' adjacent the edges thereof opposite from edges 37, 37'. It will be noted that the edges 37, 37' are the ones which will be adjacent the upper edge of the seat when the sides are in the assembled seat, as will be later described. In addition, a plurality of slits or notches 39, 39' are provided respectively along the edges 37, 37' so that when the sidepieces 23, 23' are bonded to the other portions of the covering 13, as will be hereinafter described, the bonding is smooth and the upper edges 37, 37' can conform to the shape of the covering 13. Also, it will be understood that notches 39, 39' facilitate folding.

The rearward ends 41, 41' respectively of sidepieces 23, 23' and the forward ends 43, 43' respectively of the sidepieces are bonded together by heat-sealing to form the loop or continuous side 45 shown in FIG. 8. The means for heat-sealing the ends of continuous side 45 is preferably by the apparatus shown in FIG. 7 which is of that known general type which utilizes high frequency radio waves. Thus, for example, the apparatus 47 shows a source of radio energy as at 49 that is connected to the movable head 51 of the apparatus 47 by the conductor 53 and to the stationary base 55 of the apparatus 47 by conductor 57. The base 55 has a cavity 59 for receiving the sidepieces 23, 23' to be bonded together. The pieces 23, 23' are placed in the cavity with the faces together which will be the ultimate exterior faces in the finished product. The head 51 carries electrodes 61, 61' and the head is reciprocated by suitable means as the arm 63 attached to a suitable reciprocating mechanism, not shown. Thus, the head 51 is moved downwardly until the electrodes 61, 61' contact the press downwardly on the ends of the sidepieces 23, 23'. Then, the radio energy is caused to pass therethrough to heat the vinyl and cause heat-sealing or binding thereof along the lines 65, 65'. It will be understood that the broken line representation of the head 51 in FIG. 7 is the head in the downward position and the solid line representation shows the head in the upward position. It will further be understood that either the stationary base 55 or the head 51 can act as the ground and the other can act as the antenna of the radiofrequency waves so that there is a passage of the radiofrequency through the sidepieces 23, 23' as above-described. After heat-sealing the ends of pieces 23, 23' as above-described to form the continuous side 45, the side is preferably placed under heat lamps, not shown, to make it more pliable for the attachment to the other part of the covering 13, as will be described later.

The backup piece 27 is formed from a relatively thin supported vinyl which will not be exposed to view in the finished seat and can be of relatively cheap material. It is cut in the general shape of the plan of the seat to be formed. Thus, for the seat 11 the piece 27 is elongated and somewhat pointed at one end. The quilting medium 29 is of substantially the same size and shape as the backup piece 27. The quilting medium piece 29 is formed of a suitable heat-sealable quilting medium, as for example, a heat-sealable foam, such as heat-sealable acetate foam, heat-sealable vinyl foam or heat-sealable urethane foam. The toppiece 31 is of the general shape of pieces 27, 29 except that it is substantially larger so that when the pieces 27, 29 are assembled therewith as will be hereinafter described, to form the top assembly 67, an edge portion 69 of the toppiece 31 will be exposed around the periphery thereof, as best seen in FIG. 11. In addition, in the diecutting, tabs 71 are provided adjacent the four corners of the piece 31 and apertures 73 are provided therethrough for a purpose later to be described. The material from which toppiece 31 is formed is a lightweight flexible supported vinyl, which, for example, could be in the order of 0.025 to 0.030 inches.

Next, the top assembly 67 is formed from the components 27, 29, 31 by bonding or heat-sealing the components along the spaced-apart lines 75 and with the pieces 27, 29 in alignment with one another and centrally of toppiece 31 to expose the edge portion 69 with the quilting medium piece 29 between backup piece 27 and toppiece 31 as best seen in FIGS. 11 and 12. It will be understood that the top assembly 67 as shown in FIG. 11 is upside down and normally when assembled with the remainder of the bicycle seat, the toppiece 31 will be on top, as best seen in FIGS. 17—19. The heat-sealing of the top assembly 67 along the lines 75 is preferably done by means of apparatus 77 similar to apparatus 47 except that the electrodes 79 are spaced along the head 81 to correspond to the spaced-apart lines 75. Also, the base 83 has a stepped cavity 85 with a central portion 87 thereof to receive backup 27 in the bottom thereof and next the quilting medium piece 29. A plurality of blocklike members 89 are provided around the periphery of the cavity to establish the step. In other words, the inner ends 91 of the blocks 89 contact and form the locating means for the peripheral edges of the backup piece 27 and quilted medium piece 29. The tops 93 of the blocks 89 provide a place for the toppiece 31 to rest thereon and the outer wall 95 of the cavity 85 provides the means to engage and locate the outer periphery of the toppiece 31. In addition, cutout portions 97 are provided to receive the tabs 71. In the heat-sealing step above-described there is fusion between the three components 27, 29 and 31 along the line 75, as best seen in FIG. 12. This causes the toppiece 31 to have a quilted appearance with transverse protrusions 99 being formed between the lines 75 as will best be seen in FIGS. 17 and 18. Piece 31 will maintain this quilted appearance indefinitely despite continual pressing down on the top thereof when the rider uses the seat. The resiliency of the vinyl of the toppiece 31 and the quilting medium piece 29 causes this quilted appearance to be maintained.

Next, the edge portion 69 of the top assembly 67 is bonded or heat-sealed to the continuous side 45 adjacent the edges 37, 37' to establish the covering 13. This heat-sealing is done with the covering 13 turned wrong side out and is done along a line 101 that extends completely around the covering 13 so that when the covering is turned right side out the bonding line 101 will be on the inside of the cover and a smooth joint 103 will be apparent on the outside thereof which is pleasing in appearance. One of the important features of the present invention is the aligning of the two components, that is, the continuous side 45 and the top assembly 67 during the heat-sealing. It can be appreciated that if such an alignment were not substantially exact, that the covering 13 would not be uniformly and correctly formed. Thus, the means for holding the continuous side 45 in alignment with top assembly 67 is preferably by a holder 105, as best seen in FIGS. 14—16. Holder 105 includes an upstanding continuous wall 106 that extends around a path that is substantially the shape of the top of the seat to be formed. The top edge 107 of the wall 106 forms the ground or one electrode of the heat-sealing apparatus 110 which is similar to the previously described heat-sealing apparatuses 47, 77. A plurality of upstanding pins 109 are rigidly supported from wall 106 by brackets 111 in spaced-apart relationship around the edge 107 but spaced outwardly therefrom. The pins 109 are spaced-apart to correspond to the holes 35, 35' in continuous side 45. The continuous side 45 is placed on holder 105 with the pins 109 extending through the holes 35, 35', as best seen in FIG. 15. Next, a mandrel 113 which is of the same shape as wall 106 and slightly smaller than the inside surface thereof is placed down into the holder 105 to hold the continuous side 45 downwardly and closely adjacent the wall 106. Mandrel 113 is provided with spacers 115 on the bottom thereof upon which the main body of the mandrel rests. In addition, the mandrel 113 is preferably provided with a hole 117 to facilitate placing the removal of the mandrel by hand. Then, with the continuous side 45 in place, as above-described, the top assembly 67 is placed upside down on the holder 105 with four of the corresponding pins 109 extending upwardly through the apertures 73 as best seen in FIG. 16 so that the top assembly 67 and continuous side 45 are held correctly in place with edge portion 69 abutting edges 37, 37' ready to be heat-sealed. The holder 105 is preferably removable from the apparatus 110 so that the above-described loading operation of the continuous side 45 and the top assembly 67 can be accomplished away from the machine if desired. Then, the holder 105 which is formed of a suitable material to conduct the radiofrequency is placed on the lower base 119 whereby the radiofrequency can travel up to the edge 107 and when the upper electrode 121 is brought downwardly on top of the edge portion 69, radiofrequency can travel through the edge portion 69 and through the continuous side 45 adjacent the upper edges 37, 37' to cause heat-sealing along the line 101. The electrode 121 is preferably flat and of a shape in plan generally like upper edge 107 but of a small enough size so that it will fit down on top of the edge 107 and miss pins 109 in traveling to the downward position as shown in broken lines in FIG. 13. The advantages of providing an edge portion 69, instead of having the pieces 27 and 29 extend to the edge of piece 31, can be appreciated when it is considered that it is not necessary to set the output of the radiofrequency so high as would be necessary if there were heat-sealing through pieces 27, 29, 3 and 41. In addition, if there were heat-sealing through these four components the sealing could not be uniform due to variations in thicknesses, whereas with only edge portion 69 to be sealed to side 41 these two thicknesses can be controlled and a uniform seal can be obtained.

After the covering 13 is heat-sealed as above-described, it is turned right side outward, binding 23 is applied to the lower edge of side 45, and covering 13 is placed over base 15 with pad 17 disposed between the covering and the base. Finally, the covering 13 is fixedly attached to the base 15 by the rivets 25 in a well-known manner and by well-known apparatus.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. A bicycle seat comprising a rigid base, a continuous side of plastic, a top assembly including a toppiece of flexible plastic, said toppiece adjacent the periphery thereof being heat-sealed bonded to said side adjacent the upper edge thereof to provide a covering, and rivet means attaching said side to said base; said toppiece being formed of a lightweight vinyl, and said side being formed of a supported vinyl stiffer and heavier than the vinyl of said toppiece.

2. A bicycle seat comprising a rigid base, a continuous side of plastic, a top assembly including a toppiece of flexible plastic, said toppiece adjacent the periphery thereof being heat-sealed bonded to said side adjacent the upper edge thereof to provide a covering, and rivet means attaching said side to said base; said toppiece being formed of a lightweight vinyl, and said side being formed of a supported vinyl stiffer and heavier than the vinyl of said toppiece; said top assembly in addition to said toppiece including a vinyl backup piece and quilting medium piece, and said toppiece, said backup piece and said quilting medium piece are heat-seal bonded together along spaced-apart lines.